Patented Apr. 9, 1935

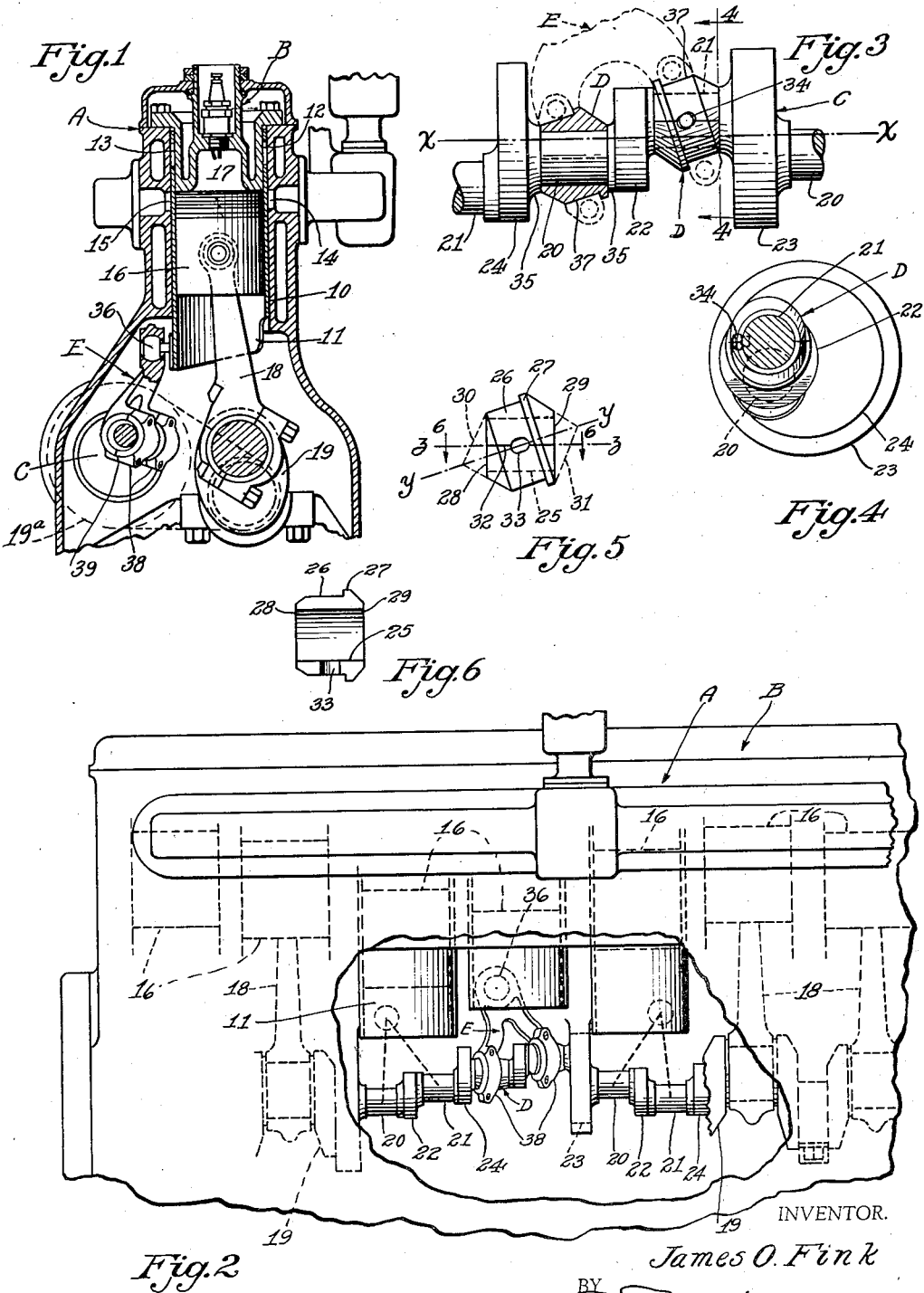

1,996,914

UNITED STATES PATENT OFFICE 1,996,914

ENGINE

James O. Fink, Detroit, Mich., assignor to Continental Motors Corporation, Detroit, Mich., a corporation of Virginia Application July 27, 1932, Serial No. 625,018

17 Claims. (Cl. 74—60)

This invention relates primarily to engines and refers more particularly to an improved mechanism for operating a sleeve of a sleeve valve internal combustion engine. My invention also relates to improvements in wobble cranks whereby rotary motion of the wobble shaft is converted into combined reciprocation and oscillation of the driven member, the latter in the illustrated embodiment being an engine sleeve valve.

It is an object of my invention to provide a simplified and improved wobble shaft. It has been generally customary in the past to machine a wobble crank by turning the shaft on an axis through the wobble crank, but this leads to considerable difficulties rendering such practices commercially impractical especially in connection with multi-crank valveshafts since the whole shaft must be turned successively about the axes of the respective wobble cranks. Such axes do not ordinarily lie within the end faces of the valveshaft rendering such method inaccurate, expensive, and impractical.

In my Patent No. 1,899,189, issued February 28, 1933, I have disclosed and broadly claimed an improved wobble shaft for overcoming the aforesaid difficulties and my present invention aforesaid constitutes an improvement over my former invention disclosed in my aforesaid patent.

In my patent aforesaid, the spaced actuating or bearing portions of each wobble crank are formed by turning the bearing portions on axes parallel with the valveshaft relatively closely adjacent to the valveshaft axis, the bearing portions being in the form of ball portions.

In my subject invention, I have utilized the broad teachings of my patent aforesaid by providing spaced actuating or bearing portions of each wobble crank parallel with the valveshaft axis, but in addition I have formed the wobble crank portions generally cylindrical instead of spherically whereby to cheapen the manufacture of the valveshaft and to improve its accuracy in aligning the wobble crank with the mechanism driven thereby.

In order to provide for the desired swinging movement of the actuated mechanism, I have also provided bearing members carried by the wobble crank portions and forming a part thereof, these bearing portions having actuating surfaces formed at an angle with the axis of the associated wobble crank portion. In this manner the bearing portions may be machined separately from the wobble shaft and such bearing portions may be cylindrically formed if desired so as to avoid the aforesaid machining of ball surfaces.

Further objects and advantages of my invention will be apparent as this specification progresses, reference being had to the accompanying drawing in which;

Fig. 1 is a sectional elevation view through a typical cylinder of a multi-cylinder engine incorporating my improvements.

Fig. 2 is a fragmentary side elevation view of the engine with a portion of the crankcase broken away so as to illustrate my wobble shaft.

Fig. 3 is a detail view of a typical wobble crank of the wobble shaft.

Fig. 4 is a sectional view of the wobble crank of Fig. 3, along the line 4—4 of Fig. 3.

Fig. 5 is an elevation view of a typical bearing member illustrating in dotted lines one manner of producing the same, and Fig. 6 is a sectional view along line 6—6 of Fig. 5.

In the drawing the engine A is illustrated as the well known single sleeve valve type, the typical cylinder 10 thereof containing the sleeve valve 11 having suitable ports 12, 13 for cooperation in the well known manner with the intake and exhaust ports 14, 15 respectively. A cylinder head structure B closes the outer end of the cylinder, forming with piston 16, the combustion chamber 17. The piston 16 actuates connecting rod 18 and crankshaft 19, all of which parts are well known and may be of any suitable form and construction.

For driving the various sleeve valves 11, I have provided a wobble valveshaft C adapted to be driven by suitable drive 19a in the usual manner from crankshaft 19 at half speed for the four stroke cycle engine illustrated.

The valveshaft C has a plurality of longitudinally spaced wobble cranks respectively associated with each sleeve and the description will, for the most part, be limited to one of these wobble cranks as shown in Figs. 3 and 4, it being understood that they are all similarly constructed.

Each wobble crank is formed with a pair of crank portions 20, 21 having their longitudinal axes disposed parallel with the longitudinal axis X—X of valveshaft C—these crank portions in the illustrated embodiment of my invention having cylindrical surfaces. The crank portions 20, 21 are suitably joined by shaft portion 22 and the wobble shaft C has suitable spaced bearings 23. Adjacent wobble cranks are also suitably connected either by a bearing 23 or by shaft portion 24.

Mounted on each crank portion 20, 21 is a split bearing member D formed with an inner cylindrical opening 25 fitting the associated crank portion and an outer cylindrical bearing surface 26 whose axis Y—Y lies at an angle with the axis Z—Z of the opening 25. The member D preferably has a flange 27 concentric with the axis of the bearing surface 26, the end faces 28, 29 being perpendicular with the axis Z—Z. One convenient method of forming the bearing members D is diagrammatically illustrated in Fig. 5 wherein the dotted lines indicate the bearing member turned symmetrically about axis Y—Y with conical end portions 30, 31, these end portions being cut away to provide the faces 28, 29. The opening 25 is formed about axis Z—Z and the bearing member D is split to form companion pieces for assembly of the bearing. Thus the bearing D is shown as split in a plane containing axis Z—Z and indicated by the dividing line 32 in Fig. 5, this line being preferably at an angle with axis Y—Y so that the parting line of the cap of wobble yoke link E does not pass over line 32 in parallelism as will be later apparent. The bearing member D has an opening 33 for receiving the screw 34 whereby the bearing member is fixed against rotation on the associated crank portion. Longitudinal movement of the bearing members D is prevented by reason of the shoulders 35 abutting faces 28 and 29 as shown in Fig. 3. The bearing members D for each pair of crank portions 20, 21 are reversed to position flanges 27 in the relationship illustrated in Fig. 3 so that the link E will not move longitudinally on surfaces 26.

The sleeve driving wobble yoke link E comprises a three point connecting drive between wobble shaft C and sleeve valve 11. The upper single point is in the form of a ball and socket joint 36 and the lower two spaced points are in the form of cylindrical bearing openings 37 respectively fitting surfaces 26, the removable caps 38 permitting assembly. The caps 38 have surfaces 39 faced with the link E, these surfaces preferably lying at right angles with axis Y—Y whereby the cap edges moving around surface 26 will cross edge 32 out of parallelism for good wearing condition.

It will be noted that the axes Y—Y of the bearing members D of crank portions 20, 21 are parallel, the offset crank portions being preferably relatively angularly spaced, as shown in Fig. 4, as well as being longitudinally spaced.

As the wobble shaft is rotated, crank portions 20, 21 will rotate with bearing members D. The link E will be moved with a wobble movement imparting the desired combined reciprocation and oscillation to the sleeve 11, surfaces 26 rotatably bearing in openings 37 of the forked link E.

While I prefer to provide each wobble crank with a pair of crank portions 21, 22, it will be apparent that either crank portion alone, with its associated bearing member D, constitutes a wobble crank and may be used singly for obtaining combined movement.

Various modifications and changes may be made from the particular construction disclosed by me for illustrating my invention and I do not limit my invention to the specific construction described and illustrated.

What I claim as my invention is:

1. A driving mechanism for an engine sleeve valve including, a shaft driven by the engine, said shaft having a wobble crank formed of longitudinally and angularly spaced cylindrical crank portions having their longitudinal axes substantially parallel with the axis of said shaft, a bearing member carried by each of said crank portions, said bearing members having substantially cylindrical bearing surfaces, the axes of said bearing surfaces being inclined relative to the axis of said shaft, said wobble crank being adapted to impart combined oscillation and reciprocation to said sleeve valve.

2. A driving mechanism for an engine sleeve valve including, a shaft driven by the engine, said shaft having a wobble crank formed of longitudinally and angularly spaced cylindrical crank portions having their longitudinal axes substantially parallel with the axis of said shaft, a bearing member carried by each of said crank portions, said bearing members having substantially cylindrical bearing surfaces, the axes of said bearing surfaces being inclined relative to the axis of said shaft, said wobble crank portions being adapted to actuate two points of a three point sleeve actuating element whereby to impart combined reciprocation and oscillation to said sleeve.

3. A driving mechanism for an engine sleeve valve including, a shaft driven by the engine, said shaft having a wobble crank formed of longitudinally and angularly spaced cylindrical crank portions having their longitudinal axes substantially parallel with the axis of said shaft, a bearing member carried by each of said crank portions, said bearing members having substantially cylindrical bearing surfaces, the axes of said bearing surfaces being inclined relative to the axis of said shaft, said wobble crank being adapted to impart combined oscillation and reciprocation to said sleeve valve, the axes of said bearing surfaces being parallel.

4. A wobble crank for imparting combined reciprocating and oscillating movement to a sleeve valve, said wobble crank comprising a shaft having a pair of spaced crank portions having their axes disposed substantially parallel to the axis of said shaft, bearing members carried by said crank portions, said bearing portions being adapted to actuate two points of a three point actuating element.

5. A wobble crank for imparting combined reciprocating and oscillating movement to a sleeve valve, said wobble crank comprising a shaft having a pair of spaced crank portions having their axes disposed substantially parallel to the axis of said shaft, bearing members carried by said crank portions, said bearing portions being adapted to actuate two points of a three point actuating element, said crank portions being substantially cylindrical.

6. A wobble crank for imparting combined reciprocating and oscillating movement to a sleeve valve, said wobble crank comprising a shaft having a pair of spaced crank portions having their axes disposed substantially parallel to the axis of said shaft, bearing members carried by said crank portions, said bearing portions being adapted to actuate two points of a three point actuating element, said bearing members having substantially cylindrical bearing surfaces engageable with said actuating element.

7. A wobble crank for imparting combined reciprocating and oscillating movement to a sleeve valve, said wobble crank comprising a shaft having a pair of spaced crank portions having their axes disposed substantially parallel to the axis of said shaft, bearing members carried by said crank portions, said bearing portions being adapted to actuate two points of a three point actuating element, said bearing members having substantially cylindrical bearing surfaces engageable with said actuating element, said bearing surfaces having their axes inclined with respect to the axis of said shaft.

8. A wobble shaft for driving a sleeve valve link, said wobble shaft having a pair of link actuating crank portions, and bearing means carried by said crank portions, said crank portions being adapted to actuate said link and sleeve whereby to impart combined reciprocation and oscillation to said sleeve, said bearing means including a bearing member having substantially cylindrical inner and outer surfaces whose axes are relatively inclined.

9. A wobble shaft for imparting reciprocation and oscillation to a sleeve valve, said shaft comprising an offset portion having longitudinally spaced crank portions, bearing members surrounding said crank portions, said bearing members having their axes inclined relative to the axis of the crank portion associated therewith.

10. A wobble shaft comprising, an offset portion formed with a substantially cylindrical crank, the longitudinal axes of said crank and shaft being disposed substantially parallel, and means surrounding said crank and formed with a substantially cylindrical bearing surface having its longitudinal axis disposed at an angle with the axis of said crank.

11. A wobble shaft for actuating two points of a three point sleeve actuating element whereby to impart combined oscillating and reciprocating movement to the sleeve, said shaft having a pair of cooperating longitudinally and angularly spaced crank portions, and a segmental bearing member surrounding each of said crank portions, the axes of said crank portions being substantially parallel with the shaft axis, the axes of the bearing members being inclined to the shaft axis.

12. A wobble shaft for actuating two points of a three point sleeve actuating element whereby to impart combined oscillating and reciprocating movement to the sleeve, said shaft having a pair of cooperating longitudinally and angularly spaced crank portions, and a bearing member surrounding each of said crank portions, said bearing members having their longitudinal axes disposed at an angle relative to the axis of said shaft.

13. In a mechanism for imparting combined reciprocation and oscillation to a sleeve valve, a link adapted for single point sleeve actuation and formed with a forked portion, said forked portion having spaced openings, a removable cap cooperating with said openings, a valveshaft having a pair of cooperating longitudinally spaced crank portions having their longitudinal axes disposed substantially parallel with the axis of said valveshaft, a bearing member carried by each of said crank portions within said spaced openings respectively, said bearing members being split to provide an angular sliding movement between the lines of said split and the lines of engagement between said cap and forked link portions.

14. A wobble shaft comprising, an offset crank having its longitudinal axis disposed substantially parallel with the axis of said shaft, and a member surrounding said crank and having an external bearing portion whose longitudinal axis is disposed at an angle to said crank axis.

15. A wobble shaft comprising, an offset crank having its longitudinal axis disposed substantially parallel with the axis of said shaft, and a member surrounding said crank having its longitudinal axis disposed at an angle to said crank axis, said member having substantially cylindrical inner and outer surfaces.

16. A wobble shaft comprising, an offset crank having its longitudinal axis disposed substantially parallel with the axis of said shaft, and a member surrounding said crank and having an external bearing portion whose longitudinal axis is disposed at an angle to said crank axis, and means securing said member to said crank.

17. A wobble shaft comprising, an offset crank having its longitudinal axis disposed substantially parallel with the axis of said shaft, and a member surrounding said crank and having an external bearing portion whose longitudinal axis is disposed at an angle to said crank axis, said member being split substantially longitudinally thereof.

JAMES O. FINK.